US009719850B2

(12) United States Patent
Isozaki et al.

(10) Patent No.: US 9,719,850 B2
(45) Date of Patent: Aug. 1, 2017

(54) SPATIAL LIGHT MEASURING METHOD AND SPATIAL LIGHT MEASURING SYSTEM

(71) Applicant: TOPCON Corporation, Tokyo-to (JP)

(72) Inventors: Hisashi Isozaki, Tokyo-to (JP); Kazunori Sato, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 0 days.

(21) Appl. No.: 15/207,917

(22) Filed: Jul. 12, 2016

(65) Prior Publication Data

US 2017/0023403 A1 Jan. 26, 2017

(30) Foreign Application Priority Data

Jul. 21, 2015 (JP) .................................. 2015-144010

(51) Int. Cl.
*G01J 1/42* (2006.01)
*G01J 1/02* (2006.01)

(52) U.S. Cl.
CPC ........... *G01J 1/4204* (2013.01); *G01J 1/0266* (2013.01); *G01J 1/4228* (2013.01); *G01J 2001/4247* (2013.01)

(58) Field of Classification Search
CPC .... G01J 1/0403; G01J 1/18; G01J 1/16; G01J 2001/1678; G01C 21/265; G01B 11/002
USPC .................................. 356/121–123, 213–226
See application file for complete search history.

(56) References Cited

U.S. PATENT DOCUMENTS

| 5,796,613 A * | 8/1998 | Kato | G01C 21/28 342/457 |
|---|---|---|---|
| 7,365,638 B2 * | 4/2008 | Eguchi | B60Q 3/18 340/425.5 |
| 2009/0312987 A1 * | 12/2009 | Uedaira | G01J 1/18 702/189 |
| 2017/0023351 A1 * | 1/2017 | Isozaki | G01S 17/66 |
| 2017/0023404 A1 * | 1/2017 | Isozaki | G01J 1/16 |

FOREIGN PATENT DOCUMENTS

| JP | 4-204006 A | 7/1992 |
|---|---|---|
| JP | 6-117923 A | 4/1994 |
| JP | 7-280645 A | 10/1995 |

(Continued)

*Primary Examiner* — Hoa Pham
(74) *Attorney, Agent, or Firm* — Nields, Lemack & Frame, LLC

(57) ABSTRACT

A spatial light measuring system is disclosed, which is configured to store illuminance data acquired by measurement in a new state as initial data, to make the traveling vehicle run after acquiring the initial data, to save illuminance data acquired by the illuminance measuring instrument as daily management data, and to specify an illuminance measuring position and an image acquiring position based on the speed of the traveling vehicle and to use a correction coefficient due to a distance from the ground to an illuminance measuring instrument mounting position and a correction coefficient due to the speed of the traveling vehicle and is configured to correct daily management data into illuminance data on the ground based on both the correction coefficients and to judge the soundness of the illumination facility based on a comparison between the illuminance data as corrected, the initial data and based on the images as acquired.

3 Claims, 3 Drawing Sheets

(56) References Cited

FOREIGN PATENT DOCUMENTS

| JP | 10-9951 A | 1/1998 |
|---|---|---|
| JP | 10-288549 A | 10/1998 |
| JP | 2005-140644 A | 6/2005 |

* cited by examiner

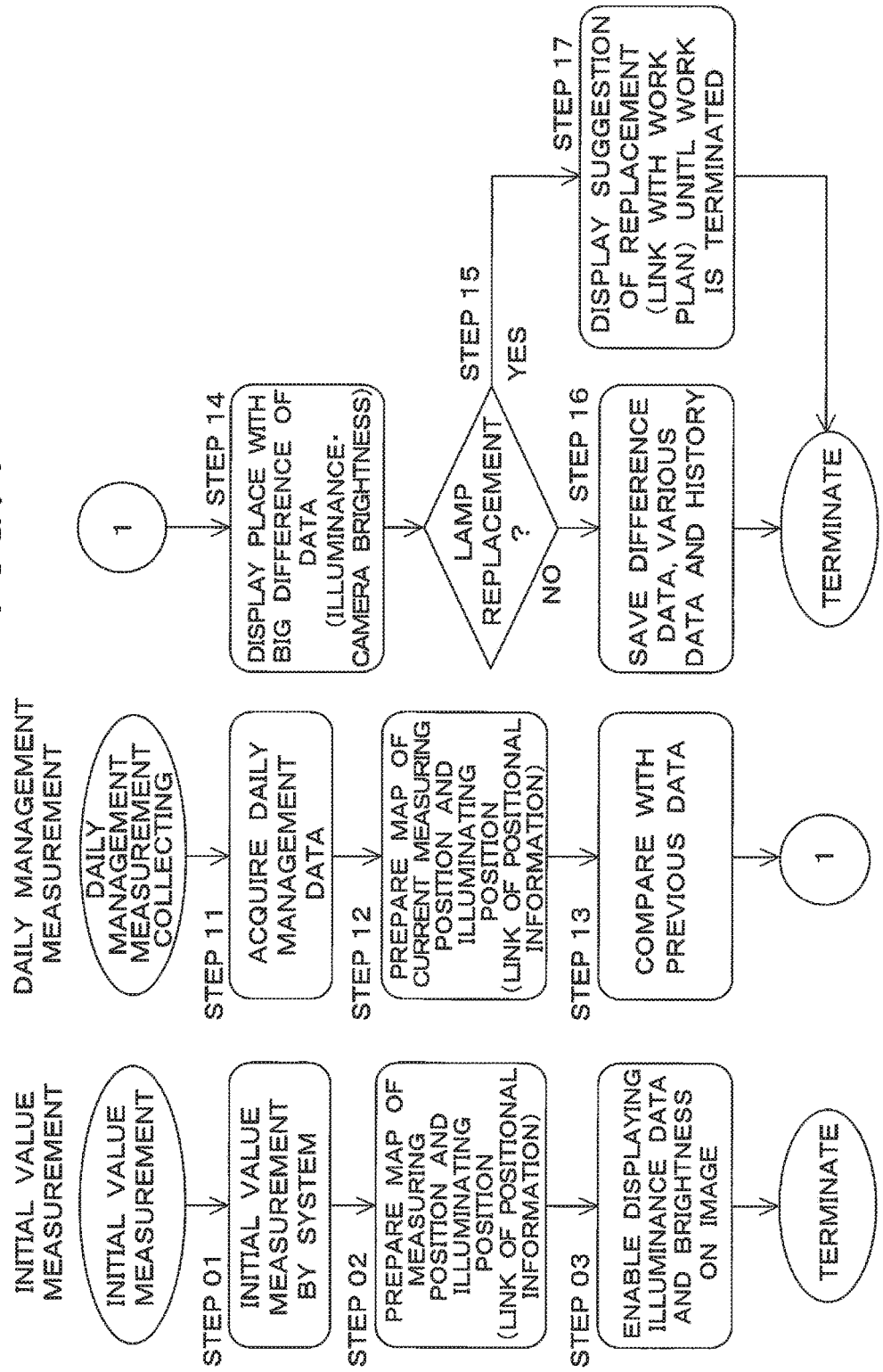

SPATIAL LIGHT MEASURING METHOD AND SPATIAL LIGHT MEASURING SYSTEM

BACKGROUND OF THE INVENTION

The present invention relates to a spatial light measuring method and a spatial light measuring system which perform an illuminance measurement in a wide area, e.g., an illuminance measurement on a road such as a general road, an expressway or the like, and an illuminance measurement in a tunnel, or the like.

In illumination facilities installed on a road or in a tunnel or the like, it is necessary to meet standards or criteria which determine an illuminance, and an illuminance measurement and an illuminance distribution measurement of the illumination facilities are performed.

Further, since a decrease in illuminance of an illumination lamp, or a blowout of the lamp, or the like occurs over an elapse of time, the illuminance measurement is performed as a daily management.

Japanese Patent Application Publication No. Hei 10-288549 discloses one which detects a decrease in an illuminance of an illumination lamp and a blowout of the lamp.

Japanese Patent Application. Publication No. Hei 10-288549 discloses a brightness/darkness discriminating and measuring apparatus, and the brightness/darkness discriminating and measuring apparatus measures the brightness/darkness of an illumination lamp in a tunnel and specifies a position of the illumination lamp. For this reason, the brightness/darkness discriminating and measuring apparatus comprises a special photosensor for detecting the illumination lamp, a reflector provided at an already determined position on a wall surface of the tunnel, a position detecting light sensor for detecting the reflector, and an axle sensor for measuring a running distance of a measuring vehicle.

In Japanese Patent Application Publication No. Hei 10-288549, a configuration is complicated, and reflectors installed on the wall surface are required for the purpose of specifying positions of the illumination lamp. For this reason, there is a problem in which a measuring illumination state is limited to the illumination lamps installed in the tunnel.

SUMMARY OF THE INVENTION

It is an object of the present invention to provide a spatial light measuring method and a spatial light measuring system which can measure an illuminance with a simple configuration in any illumination lamp installing environment, e.g., an illumination lamp installed in an open space other than a tunnel or an illumination lamp installed in the tunnel, or the like.

To attain the object as described above, a spatial light measuring method according to the present invention which determines a soundness of an illumination facility comprises an initial value measurement wherein the initial value measurement includes a step of, acquiring initial data on the ground in a state where the illumination facility is new by an illuminance measuring instrument in a running direction of a traveling vehicle at predetermined intervals, and a daily management measurement wherein the daily management measurement includes steps of, mounting the illuminance measuring instrument and an image pickup device on the traveling vehicle, measuring an illuminance while running and acquiring an image, specifying an illuminance measuring position and an image acquiring position based on a speed of the traveling vehicle, correcting illuminance data acquired by the measurement while running into illuminance data on the ground based on a correction coefficient due to a distance from the ground to an illuminance measuring instrument mounting position and a correction coefficient due to the speed of the traveling vehicle, comparing the illuminance data as corrected with the initial data and confirming a deteriorated state of an illumination facility based on the image as acquired.

Further, a spatial light measuring system according to the present invention comprises an illuminance measuring instrument for measuring an illuminance on the ground in a state where an illumination facility is new in a running direction of a traveling vehicle at predetermined intervals, the illuminance measuring instrument and an image pickup device which are mounted on the traveling vehicle for continuously acquiring images including an illumination facility at the predetermined time intervals, a speedmeter for detecting a speed of the traveling vehicle and an arithmetic device, wherein the arithmetic device is configured to store illuminance data acquired by the measurement in a new state as initial data, to make the traveling vehicle to run after acquiring the initial data, to save illuminance data acquired by the illuminance measuring instrument as daily management data, and to specify an illuminance measuring position and an image acquiring position based on the speed of the traveling vehicle as detected by the speedmeter and the arithmetic device has a correction coefficient due to a distance from the ground to an illuminance measuring instrument mounting position and a correction coefficient due to the speed of the traveling vehicle and is configured to correct daily management data into illuminance data on the ground based on both the correction coefficients and to judge the soundness of the illumination facility based on a comparison between the illuminance data as corrected, the initial data and based on the images as acquired.

Furthermore, in the spatial light measuring system according to the present invention, the arithmetic device is configured to judge whether or not the replacement of an illumination lamp is necessary based on a difference in data in the comparison between the illuminance data as corrected and the initial data, and to suggest a replacement in a case where the replacement is necessary.

According to the present invention, the spatial light measuring method which determines a soundness of an illumination facility comprises an initial value measurement wherein the initial value measurement includes a step of, acquiring initial data on the ground in a state where the illumination facility is new by an illuminance measuring instrument in a running direction of a traveling vehicle at predetermined intervals, and a daily management measurement wherein the daily management measurement includes steps of, mounting the illuminance measuring instrument and an image pickup device on the traveling vehicle, measuring an illuminance while running and acquiring an image, specifying an illuminance measuring position and an image acquiring position based on a speed of the traveling vehicle, correcting illuminance data acquired by the measurement while running into illuminance data on the ground based on a correction coefficient due to a distance from the ground to an illuminance measuring instrument mounting position and a correction coefficient due to the speed of the traveling vehicle, comparing the illuminance data as corrected with the initial data and confirming a deteriorated state of an illumination facility based on the image as acquired. As a result, daily management data can be acquired from a usual running without interrupting a traffic, and it is possible to easily judge the soundness of an illumination facility by judging a change in daily management data.

Further, according to the present invention, a spatial light measuring system comprises an illuminance measuring instrument for measuring an illuminance on the ground in a state where an illumination facility is new in a running direction of a traveling vehicle at predetermined intervals, the illuminance measuring instrument and an image pickup device which are mounted on the traveling vehicle for continuously acquiring images including an illumination facility at the predetermined time intervals, a speedmeter for detecting a speed of the traveling vehicle and an arithmetic device, wherein the arithmetic device is configured to store illuminance data acquired by the measurement in a new state as initial data, to make the traveling vehicle to run after acquiring the initial data, to save illuminance data acquired by the illuminance measuring instrument as daily management data, and to specify an illuminance measuring position and an image acquiring position based on the speed of the traveling vehicle as detected by the speedmeter and the arithmetic device has a correction coefficient due to a distance from the ground to an illuminance measuring instrument mounting position and a correction coefficient due to the speed of the traveling vehicle and is configured to correct daily management data into illuminance data on the ground based on both the correction coefficients and to judge the soundness of the illumination facility based on a comparison between the illuminance data as corrected, the initial data and based on the images as acquired. As a result, the daily management data can be acquired from the usual running without interrupting the traffic, and it is possible to easily judge the soundness of the illumination facility by judging a change in daily management data.

Furthermore, according to the present invention, in the spatial light measuring system, the arithmetic device is configured to judge whether or not the replacement of an illumination lamp is necessary based on a difference in data in the comparison between the illuminance data as corrected and the initial data, and to suggest a replacement in a case where the replacement is necessary. As a result, a work plan of a maintenance becomes to easily be designed, and further, a reliability of the maintenance can be improved.

BRIEF DESCRIPTION OF THE DRAWINGS

FIG. 4 is a schematical block diagram showing flows of initial value measurement and daily management measurement.

DETAILED DESCRIPTION OF THE PREFERRED EMBODIMENT

A description will be given below on an embodiment of the present invention by referring to the attached drawings.

First, a description will be given on general features of a spatial light measuring system according to an embodiment of the present invention by referring to FIG. 1 and FIG. 2.

Figure 1:
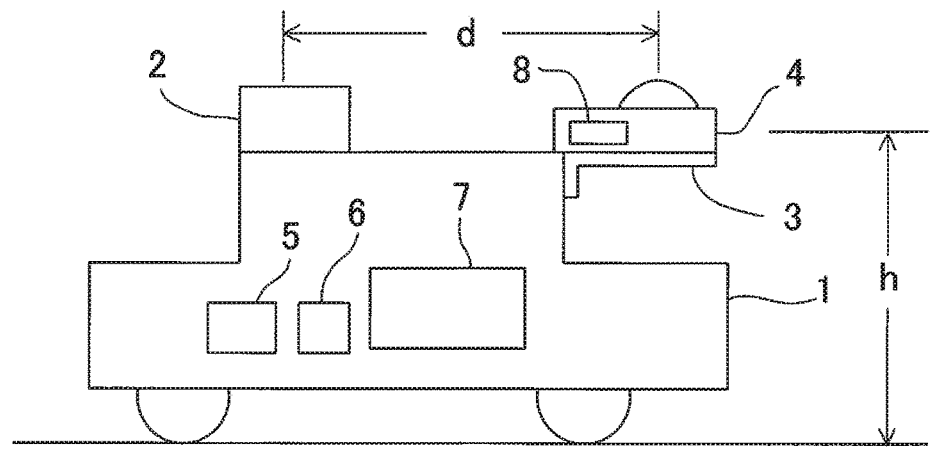
FIG. 1 is a schematical drawing of a spatial light measuring system according to an embodiment of the present invention.
Figure 2:
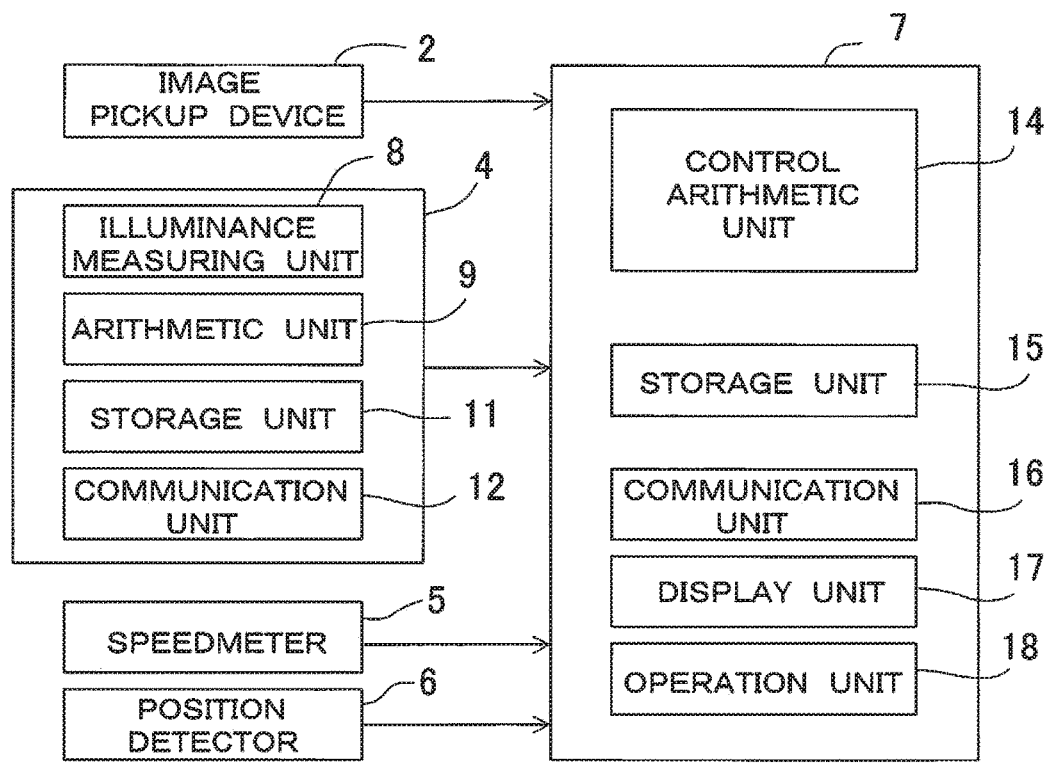
FIG. 2 is a schematical block diagram of the spatial light measuring system.

In FIG. 1, reference numeral 1 denotes a traveling vehicle such as a car, and an image pickup device 2 is provided on an upper surface of the traveling vehicle 1. Further, an illuminance measuring instrument 4 is provided on the upper surface of the traveling vehicle 1 via a support base 3. In the traveling vehicle 1, a speedmeter 5 for detecting a running speed and a position detector 6 (e.g., an IMU (Inertial Measurement Unit)) for measuring a moving distance are provided, and an arithmetic device (a PC) 7 is further equipped. It is to be noted that the arithmetic device 7 may be a portable note PC, a tablet terminal, a smartphone, or the like.

The image pickup device 2 has at least one camera, and the camera is directed toward a direction which enables to photograph a necessary area including an illumination lamp installed along a road. The camera can acquire still images at predetermined time intervals, or is a video camera. Further, the image pickup device 2 may have a plurality of cameras and be configured to acquire images around the illumination lamp in a wide range.

Further, an image acquired by the image pickup device 2 is stored in the arithmetic device 7.

The illuminance measuring instrument 4 is provided at a known height h above the ground, and horizontally supported by the support base 3. A distance d between a reference position of the illuminance measuring instrument. 4 (e.g., a center of a. light receiving unit.) and a reference position of the image pickup device 2 (e.g., the center of an image pickup element) is known. It is to be noted that, even in a case where, e.g., the traveling vehicle 1 travels on an inclined surface, since an illuminance on a horizontal plane is obtained, the support base 3 may be so arranged to support the illuminance measuring instrument 4 via a gimbal mechanism and to horizontally hold the illuminance measuring instrument 4.

Further, the illuminance measuring instrument 4 may be mechanically attachable to and detachable from the support base 3 and electrically attachable to and detachable from the arithmetic device 7, and the illuminance measuring instrument 4 may be removable.

An electrical connection between the illuminance measuring instrument 4 and the arithmetic device 7 may be either a wireless manner or a wired manner. In a case where the illuminance measuring instrument 4 is connected to the arithmetic device 7 with a wireless communication, each of the illuminance measuring instrument 4 and the arithmetic device 7 has a communication unit capable of performing a data communication.

A description will be given on general features of arrangement of the special light measuring system by referring to FIG. 2.

The illuminance measuring instrument 4 has an illuminance measuring unit 8, an arithmetic unit 9, a storage unit 11, a communication unit 12, and others. The arithmetic unit 9 has a built-in clock, and the illuminance measuring instrument 4 may perform an illuminance measurement in association with a time. An illuminance measurement result as obtained by the illuminance measuring unit 8 is transmitted to the arithmetic device 7 via the communication unit 12, and saved in the arithmetic device 7 in time series.

In the storage unit 11, a program required for the illuminance measurement, a communication program for performing the data communication, or the like are stored, and further the illuminance measurement result is saved.

The arithmetic device 7 mainly has a control arithmetic unit 14, a storage unit 15, a communication unit 16, a display unit 17 and an operation unit 18.

The storage unit 15 stores programs like an initial value measuring program for obtaining an initial value in the illuminance measurement, a daily management measuring program for periodically or appropriately carrying out, a data correcting program for associating initial data acquired in the initial value measurement with illuminance data acquired in the daily management measurement. Further, the storage unit 15 saves the illuminance data acquired in the initial value measurement and the daily management measurement in time series.

Further, image data (i.e., still image data or frame image data) from the image pickup device 2 is input to the arithmetic device 7, and the image data is saved in the storage unit 15 in time series. A running speed of the traveling vehicle 1 is detected by the speedmeter 5, and a speed signal as detected is input to the arithmetic device 7. The arithmetic device 7 saves the image data acquired by the image pickup device 2 and the speed signal in association with each other. Alternatively, the arithmetic device 7 may save the speed signal and a measurement time in association with each other.

The speedmeter 5 may be a speedmeter provided in the traveling vehicle 1. A speed signal output from the speedmeter may be input to the arithmetic device 7. Further, it may be so arranged that a moving distance of the traveling vehicle 1 is measured based on a running distance obtained by the speedmeter. Further, in a case where an IMU is used as the position detector 6, a running speed may be detected by the position detector.

When a program with respect to the spatial light. measuring system like the initial value measuring program and the daily management measuring program is stored in the storage unit 11 of the illuminance measuring instrument 4, the arithmetic unit 9 is allowed to perform a spatial light measurement and the measurement data, the image data, or the like is saved in the storage unit 11, the arithmetic device 7 may be omitted.

A description will be given below on an operation of the spatial light measuring system.

Further, the following description corresponds to a case where an illuminance measurement of an illumination facility installed along a road is performed.

In the illumination facility (not shown), an illumination lamp (not shown) is generally provided at a forward end of each of supporting poles erected at the predetermined intervals. The image pickup device 2 has a field angle which includes the illumination lamp in an image, or a direction of an optical axis of the image pickup device 2 is set so that the illumination lamp is included in an image.

Figure 3A:
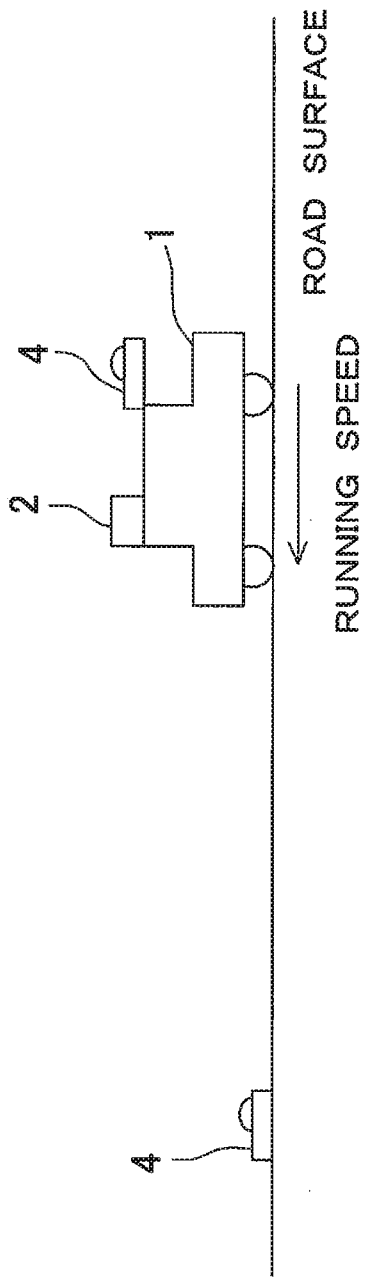
FIG. 3A is an explanatory drawing to show an acquisition of initial data performed by the spatial light measuring system.

First, a description will be given on a case of acquiring initial data by referring to FIG. 3A.

A time of acquiring the initial data is restricted to a state where the illumination facility is new and sound, e.g., a time when the illumination facility is newly installed or a time when the lamp is replaced, or the like.

According to illuminance measurement standards of JIS (Japanese Industrial Standards), the measurement is performed. at a position. which is 15 cm or less from a surface to be measured. Therefore, in an initial value measurement for acquiring initial data, the illuminance measuring instrument 4 is put on a road surface, and the measurement is performed. The illuminance measuring instrument 4 may be a removed illuminance measuring instrument which was mounted on the traveling vehicle 1 or an additionally provided illuminance measuring instrument may be used.

The illuminance measuring instrument 4 is moved at the predetermined intervals and the illuminance measurement is performed every time the illuminance measuring instrument 4 is put on. A putting position (an illuminance measuring position) of the illuminance measuring instrument 4 is known by, e.g., previously setting, or the like.

An illuminance measurement value is associated with an illuminance measuring position and recorded as a measurement result. When the illuminance measurement is performed, an illuminance at each measuring position is obtained, and an illuminance distribution along the road is obtained.

Here, the illuminance measuring instrument 4 may be moved by an operator, or may be mounted on a radio control car or the like and moved by remote control. An illuminance, which is measured according to the standard when the illuminance measuring instrument 4 is put on a road surface, is determined as a reference illuminance.

When the illuminance measurement is completed in a measurement area by the illuminance measuring instrument 4 with respect to the road surface, the illuminance measuring instrument 4 is mounted on the traveling vehicle I, and the illuminance measurement is carried out in a state where the traveling vehicle 1 is running. An illuminance obtained by performing the measurement in the running state is determined as a measured illuminance.

With respect to a position of the traveling vehicle 1, a running start position is associated with a known position in the measurement area (e.g., a first illuminance measuring position), or a relation between the measurement area and the first illuminance measuring position is made alreadyknown. When a distance from the running start position is measured by the position detector 6 or measured by the speedmeter of the traveling vehicle 1, a position of the traveling vehicle 1 can be measured with respect to the measurement area.

During the running, the images are continuously acquired by the image pickup device 2. A running speed of the traveling vehicle 1 is measured by the speedmeter 5, it is possible to specify which part of the measurement area is picked up by the still image or the frame image based on a running speed and a time interval such as an acquisition interval of the still image or a time interval between the frame images.

Further, the illuminance measuring position during the running can be determined based on an elapsed time from the measurement start time and the running distance of the traveling vehicle 1. Based on a determined illuminance measuring position during the running and a reference illuminance measuring position, it is possible to associate an illuminance measurement result during the running with the reference illuminance, the still images and the frame images.

Further, since the installation position of the illumination lamp is already-known, it is possible to prepare an initial value map (MAP) showing a relation between the measuring position and the illumination lamp and relation between an illuminance distribution and illumination lamps.

Next, distances h from the road surface differ in a case where the illuminance measuring instrument 4 is put on the road surface and in a case where the illuminance measuring instrument 4 is mounted on the traveling vehicle 1 (see FIG. 1). For this reason, a light receiving amount differs due to a difference in height, and a difference in measured illuminance occurs.

Further, in a case where the illuminance measuring instrument 4 measures the illuminance in a stationary state and in a case where the illuminance measuring instrument 4 is mounted on the traveling vehicle 1 and performs a measurement while running, since spans of light receiving times differ at different times, light receiving amounts differ and differences in measured illuminance occur.

Therefore, the illuminance measured during the running (the measured illuminance) is associated with the reference illuminance.

It is assumed that the reference illuminance is A and the measured illuminance measured during the running is B. It is assumed that a correction coefficient due to a difference in position is $\alpha$ and a correction coefficient due to a speed is $\beta$. It is to be noted that the correction coefficients $\alpha$ and $\beta$ are obtained by an actual measurement or a calculation.

Therefore, a relationship between the reference illuminance A and the measured illuminance B is expressed by the following equation:

$$B = \alpha \times \beta \times A \quad (1)$$

According to the above-mentioned steps, the initial data can be acquired.

Figure 3B:
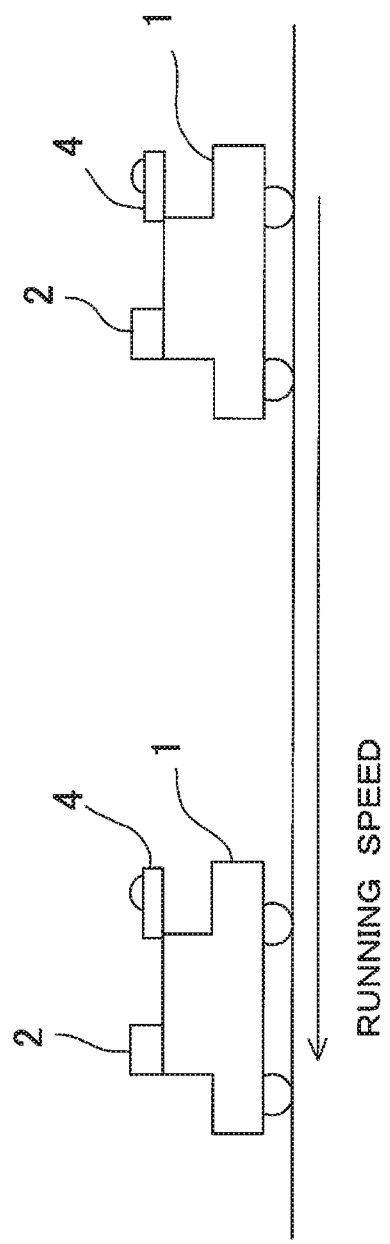
FIG. 3B is an explanatory drawing to show an acquisition of daily management data performed by the spatial light measuring system.

Next, a description will be given on the acquisition of the daily management data by referring to FIG. 3B.

A daily management measurement is performed, e.g., every predetermined time interval, or when a blowout of a lamp or a decrease in illuminance is found, or the like.

Similar to the acquisition of the initial data, the illuminance measuring instrument 4 is mounted on the traveling vehicle 1, the traveling vehicle 1 is made to run in a measurement area, and the illuminance data is acquired. Further, an illuminance distribution is prepared based on the illuminance data as acquired, and an initial value map (MAP) showing a relation between a measuring position and the illumination lamp and a relation between the illuminance distribution and the illumination lamp is prepared.

Assuming that the daily management data is B', according to the above-mentioned equation (1), the daily management data B' is able to be converted into the illuminance data. A' on the road surface. Further, assuming that a difference from the initial data B0 is C=(B0−B'), the following equation can be obtained:

$$C = (B0 - B') \quad C = \alpha \times \beta \times (A - A') \quad (2)$$

In a case where a change of an illuminance (A-A') is higher than a predetermined value, it can be assumed that the illumination of a spot where the illuminance changes has a trouble.

Further, by comparing the illuminance distribution of the initial data with the illuminance distribution of the daily management data, it is possible to confirm a decrease in overall illuminance and a decrease in partial illuminance, and these decreases can be used as an information for judging a deteriorated state of the illumination lamp. Thus, by comparing the initial data with the daily management data, it is possible to judge a soundness of the illumination facility including the blowout and a deterioration of the illumination lamp.

In a case where the blowout of the lamp has occurred, by comparing the initial data with the daily management data, it is possible to specify a position of the blowout of the lamp and, further in the present embodiment, since an image is acquired simultaneously with the acquisition of the illuminance data and the image is associated with the position of the lamp, the position of the blowout of the lamp can be specified by the image.

Further, since the daily management measurement is performed in a state where the general vehicles pass, there is an influence of a light of an oncoming vehicle or the like, but by confirming an image, it is possible to judge whether the illumination lamp has caused the deterioration or the light of an oncoming vehicle affects or the like, and judging a validity or invalidity of doubtful data become easy. Thus, by the fact that the image judgment is also adopted, the blowout of the lamp and the deterioration of the lamp can be more easily and assuredly judged, and hence an operator can efficiently perform a replacement operation.

When the image pickup device 2 has a plurality of cameras or an omnidirectional camera, the image pickup device 2 can acquire the images of not only the illumination lamp part but also a surrounding scene, and the recognizing the illumination lamp and the specifying the position of the illumination lamp by the operator can become further easy.

A description will be given on flows of the initial value measurement and the daily management measurement by referring to FIG. 4.

(Step 01) An initial value is measured in the spatial light measuring system.

(Step 02) A measuring position is linked with an illuminating position, and a map is prepared.

(Step 03) The map, the illuminance data and an image are linked with each other, and data which is to be displayed. on the image is prepared.

According to Step 01 to Step 03, the initial data is acquired.

(Step 11) The daily management measurement is performed, and daily management data is acquired. The daily management data is input to the spatial light measuring system and accumulated every daily management measurement.

(Step 12) A map of a measuring position and an illuminating position in the daily management measurement is prepared.

(Step 13) The initial data is compared with the daily management data, and it is judged whether or not a change of an illuminance has occurred and whether or not a change has exceeded a predetermined value. Further, by comparing the current daily management data with the previous daily management data, it is possible to judge a progress state of the deterioration in the illumination lamp.

(Step 14) As a result of comparison, an image of a place where a change of an illuminance has been considerable is displayed. This image display may be performed based on the judgment of the operator, or a threshold value may be set and the image display may be automatically performed.

(Step 15) Whether or not the illumination lamp is to be replaced is determined due to the image as displayed.

(Step 16) When the replacement is determined to be unnecessary, the current data and a history are saved.

(Step 17) Further, when the replacement is determined to be necessary, a suggestion of the replacement which promotes the replacement is displayed, and the display of the suggestion of the replacement is continued until the lamp is replaced. It is to be noted that the replacement may be suggested by giving a warning sound. Therefore, a presence/absence and a position of the illumination lamp to be replaced can be assuredly grasped, and a designing a work plan of a maintenance becomes easy. Further, in a case where the maintenance is carried out, a missing of a work can be prevented.

The invention claimed is:

1. A spatial light measuring method which determines a soundness of an illumination facility comprising; an initial value measurement wherein the initial value measurement includes a step of, acquiring initial data on the ground in a state where the illumination facility is new by an illuminance measuring instrument in a running direction of a traveling vehicle at predetermined intervals, and a daily management measurement wherein the daily management measurement includes steps of, mounting said illuminance measuring instrument and an image pickup device on said traveling vehicle, measuring an illuminance while running and acquiring an image, specifying an illuminance measuring position and an image acquiring position based on a speed of said traveling vehicle, correcting illuminance data acquired by the measurement while running into illuminance data on the ground based on a correction coefficient due to a distance from the ground to an illuminance measuring instrument mounting position and a correction coefficient due to the speed of said traveling vehicle, comparing said illuminance data as corrected with said initial data and confirming a deteriorated state of an illumination facility based on the image as acquired.

2. A spatial light measuring system comprising; an illuminance measuring instrument for measuring an illuminance on the ground in a state where an illumination facility is new in a running direction of a traveling vehicle at predetermined intervals, said illuminance measuring instrument and an image pickup device which are mounted on said traveling vehicle for continuously acquiring images including an illumination facility at the predetermined time intervals, a speedmeter for detecting a speed of said traveling vehicle and an arithmetic device, wherein said arithmetic device is configured to store illuminance data acquired by the measurement in a new state as initial data, to make said traveling vehicle to run after acquiring said initial data, to save illuminance data acquired by said illuminance measuring instrument as daily management data, and to specify an illuminance measuring position and an image acquiring position based on the speed of said traveling vehicle as detected by said speedmeter and said arithmetic device has a correction coefficient due to a distance from the ground to an illuminance measuring instrument mounting position and a correction coefficient due to the speed of said traveling vehicle and is configured to correct daily management data into illuminance data on the ground based on both the correction coefficients and to judge the soundness of the illumination facility based on a comparison between said illuminance data as corrected, said initial data and based on the images as acquired.

3. The spatial light measuring system according to claim 2, wherein said arithmetic device is configured to judge whether or not the replacement of an illumination lamp is necessary based on a difference in data in the comparison between said illuminance data as corrected and said initial data, and to suggest a replacement in a case where the replacement is necessary.

* * * * *